(12) United States Patent
Kodama (10) Patent No.: US 12,514,166 B2
(45) Date of Patent: Jan. 6, 2026

(54) DRIVE APPARATUS

(71) Applicant: YAMABIKO CORPORATION, Tokyo (JP)

(72) Inventor: Hisao Kodama, Tokyo (JP)

(73) Assignee: YAMABIKO CORPORATION (JP)

(*) Notice: Subject to any disclaimer, the term of this patent is extended or adjusted under 35 U.S.C. 154(b) by 204 days.

(21) Appl. No.: 18/590,274

(22) Filed: Feb. 28, 2024

(65) Prior Publication Data

US 2024/0306555 A1    Sep. 19, 2024

(30) Foreign Application Priority Data

Mar. 13, 2023  (JP) .................................. 2023-038895

(51) Int. Cl.
*A01G 3/08*   (2006.01)
*A01G 3/04*   (2006.01)
(Continued)

(52) U.S. Cl.
CPC ................ *A01G 3/085* (2013.01); *B25F 5/02* (2013.01); *A01G 2003/0461* (2013.01); *A01G 3/0475* (2013.01)

(58) Field of Classification Search
CPC ............ A01G 3/085; A01G 2003/0461; A01G 3/0475; A01G 3/053; A01G 3/047;
(Continued)

(56) References Cited

U.S. PATENT DOCUMENTS 7,159,322 B2 *   1/2007   Sasaki ..................... A01G 3/053
                                              16/110.1
7,866,048 B2 *   1/2011   Kodama ................... B25F 5/02
                                              16/110.1
(Continued)

FOREIGN PATENT DOCUMENTS

CN      103168632 A   *  6/2013   ............. B27B 17/00
EP        2196084 A2  *  6/2010   ............. A01G 3/047
JP     2008-543275 A     12/2008

OTHER PUBLICATIONS

Website of Yamabiko Corporation; URL: < https://smp.yamabiko-corp.co.jp/login >, with English translation and brief explanation; date posted on website: Feb. 9, 2023; (total 3 pages).
(Continued)

*Primary Examiner* — Ghassem Alie
(74) *Attorney, Agent, or Firm* — Harness, Dickey & Pierce, P.L.C.

(57) ABSTRACT

A hand-held drive apparatus comprises an apparatus main body including a pruner and a handle rotatably connected to the apparatus main body and including a rotation lock mechanism and a drive operation mechanism. The rotation lock mechanism includes a rotation lock lever movable to a rotation prevention position where the handle is prevented from rotating, and to a rotation allowance position where the handle is allowed to rotate. The drive operation mechanism includes a switch configured to control activation of the pruner and a throttle lever movable to a contact position where the throttle lever pushes the switch and to a non-contact position where the throttle lever is separated from the switch. The throttle lever contacts the rotation lock lever at the rotation allowance position to maintain the non-contact position, and is, when the rotation lock lever is at the rotation prevention position, allowed to move to the contact position.

15 Claims, 9 Drawing Sheets

(51) Int. Cl.
*A01G 3/047* (2006.01)
*B25F 5/02* (2006.01)

(58) Field of Classification Search
CPC ....... B25F 5/02; B24B 27/08; B27B 17/0008; Y10S 16/90
USPC ......... 30/196, 392, 210, 216, 382, 381, 383, 30/519; 74/25; 16/110.1, 436, 900; 451/516; 123/334, 402
See application file for complete search history.

(56) References Cited

U.S. PATENT DOCUMENTS

| | | | | |
|---|---|---|---|---|
| 8,156,656 | B2* | 4/2012 | Tate | A01G 3/053 16/110.1 |
| 2005/0115340 | A1* | 6/2005 | Sasaki | A01G 3/053 74/25 |
| 2010/0199949 | A1* | 8/2010 | Tamura | B25F 5/02 123/402 |

OTHER PUBLICATIONS

Website of Yamabiko Corporation; URL: < https://smp.yamabiko-corp.co.jp/ui2/member/asset-detail/62516 >, with Engllish translation and brief explanation; date posted on website: Feb. 9, 2023; (total 3 pages).

Digital pamphlet of Yamabiko Corporation published on Feb. 9, 2023 (total 2 pages).

Certificate for Application of Exception to Lack of Novelty of Invention for Yamabiko Corporation; dated Mar. 28, 2023 (total 4 pages).

* cited by examiner

DRIVE APPARATUS

CROSS REFERENCE TO RELATED APPLICATIONS

The present application claims priority under 35 U.S.C. § 119 to Japanese Patent Application, Application No. 2023-038895, filed on Mar. 13, 2023. The contents of this application are incorporated herein by reference in their entirety.

BACKGROUND

Technical Field

The present invention relates to a drive apparatus.

Related Art

There has been a hand-held work machine for pruning hedges and trees (see Japanese Translation of PCT International Application, Publication No. 2008-543275). This hand-held work machine has a work machine main body having an engine for generating drive power and a rear hand grip rotatable relatively to the work machine main body. The rear handgrip has a throttle lever for controlling output of the engine and a lock lever for restricting the rotation of the rear handgrip relative to the work machine main body.

As for such a hand-held work machine, when the throttle lever is not being operated, unlocking the lock lever allows a rotational operation on the rear handgrip relatively to the work machine main body. On the other hand, when the throttle lever is being operated, action of two members, a lock arm attached to the throttle lever and the lock lever, restricts a rotational operation on the rear handgrip relative to the work machine main body. In the latter state, even when the lock by the lock lever is forcibly released, the action of the lock arm still restricts the rotational operation on the rear handgrip relative to the work machine main body.

Of the above-described hand-held work machine, the configuration of the rotation lock mechanism is complicated.

In view of the above circumstances, the present invention provides a drive apparatus including a rotation lock mechanism having a simple configuration and easy operability.

According to an aspect of the present invention, a hand-held drive apparatus is provided. The drive apparatus comprises an apparatus main body and a handle. The apparatus main body includes a pruner configured to mow or cut an object. The handle is rotatably connected to a side of the apparatus main body, the side being opposite to the pruner, and the handle includes a rotation lock mechanism and a drive operation mechanism. The rotation lock mechanism includes a rotation lock lever, the rotation lock lever being movable to a rotation prevention position where the rotation lock lever engages with the apparatus main body to prevent the handle from rotating relatively to the apparatus main body, and to a rotation allowance position where the engagement with the apparatus main body is released and thereby the handle is allowed to rotate relatively to the apparatus main body. The drive operation mechanism includes a switch configured to control activation of the pruner and a throttle lever movable to a contact position where the throttle lever pushes the switch and to a non-contact position where the throttle lever is separated from the switch. The throttle lever is configured to, when the rotation lock lever is present at the rotation allowance position, contact the rotation lock lever to maintain the non-contact position, and to, when the rotation lock lever is present at the rotation prevention position, be allowed to move to the contact position.

According to such an aspect, the rotation lock mechanism has a simple configuration and easy operability.

DETAILED DESCRIPTION

Hereinafter, a description will be given of embodiments of the present invention with reference to the drawings. Various features described in the following embodiments can be combined with each other.

Figure 1:
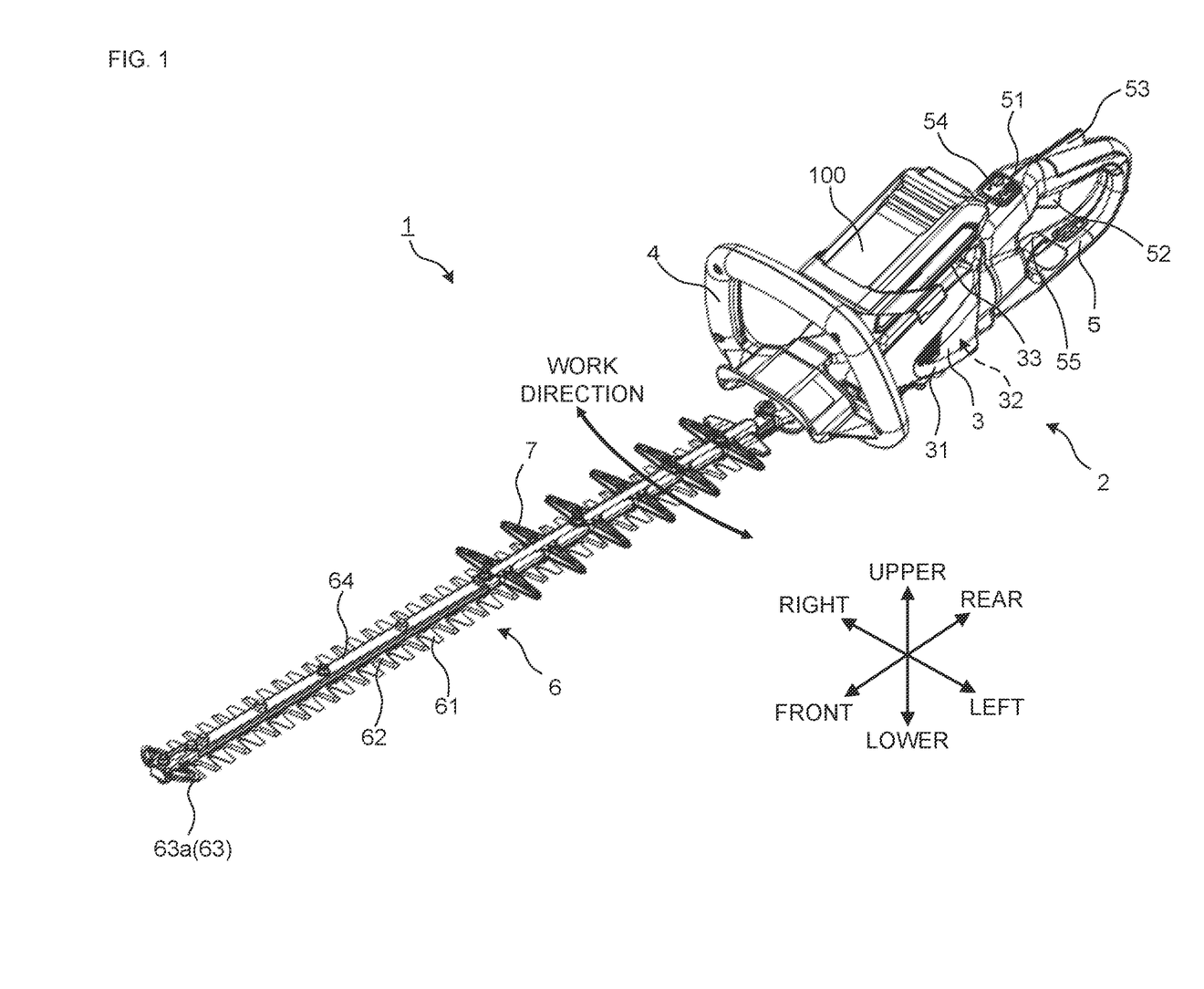
FIG. 1 is an overall upper perspective view of a hedge trimmer.
Figure 2:
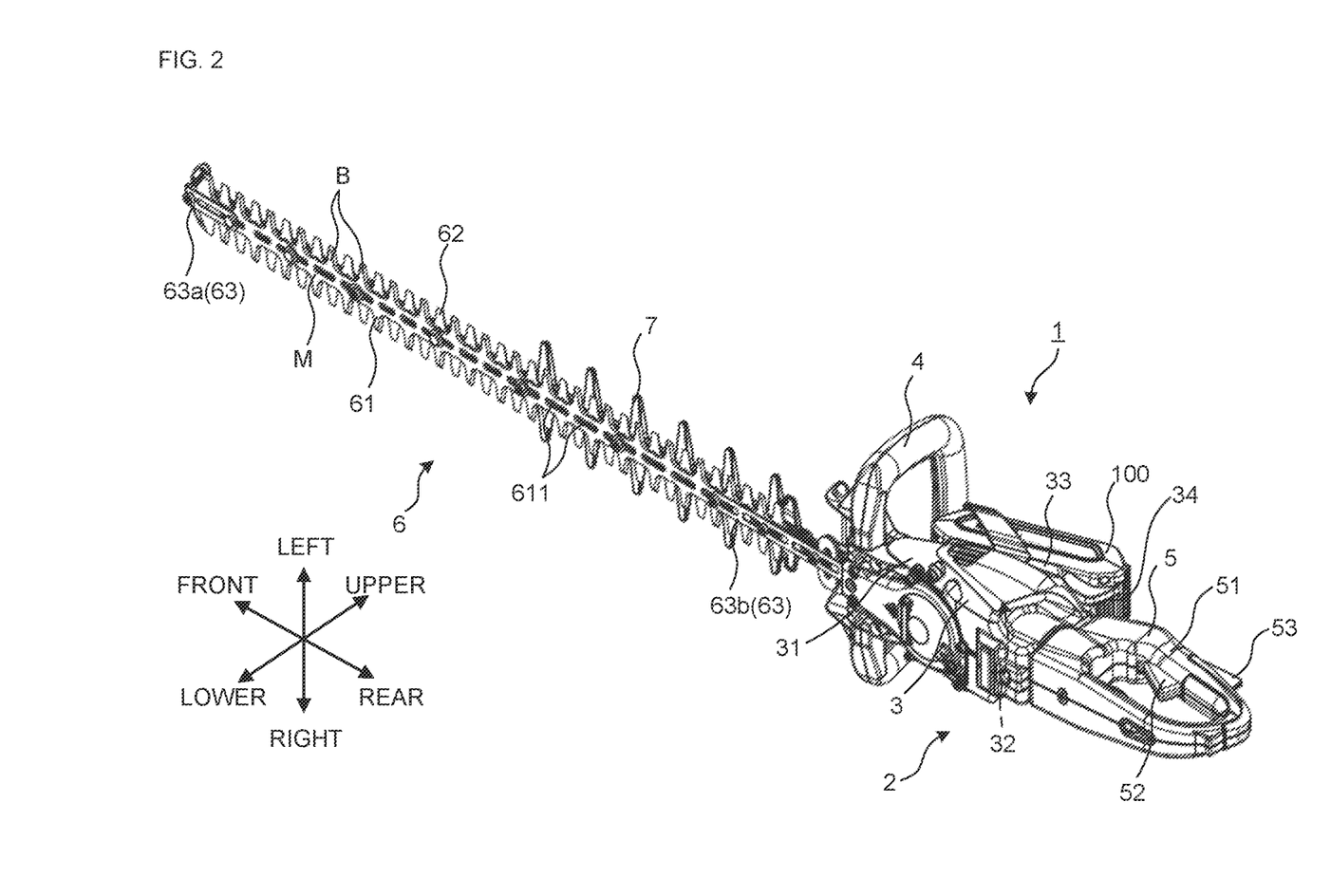
FIG. 2 is an overall lower perspective view of the hedge trimmer.
Figure 3:
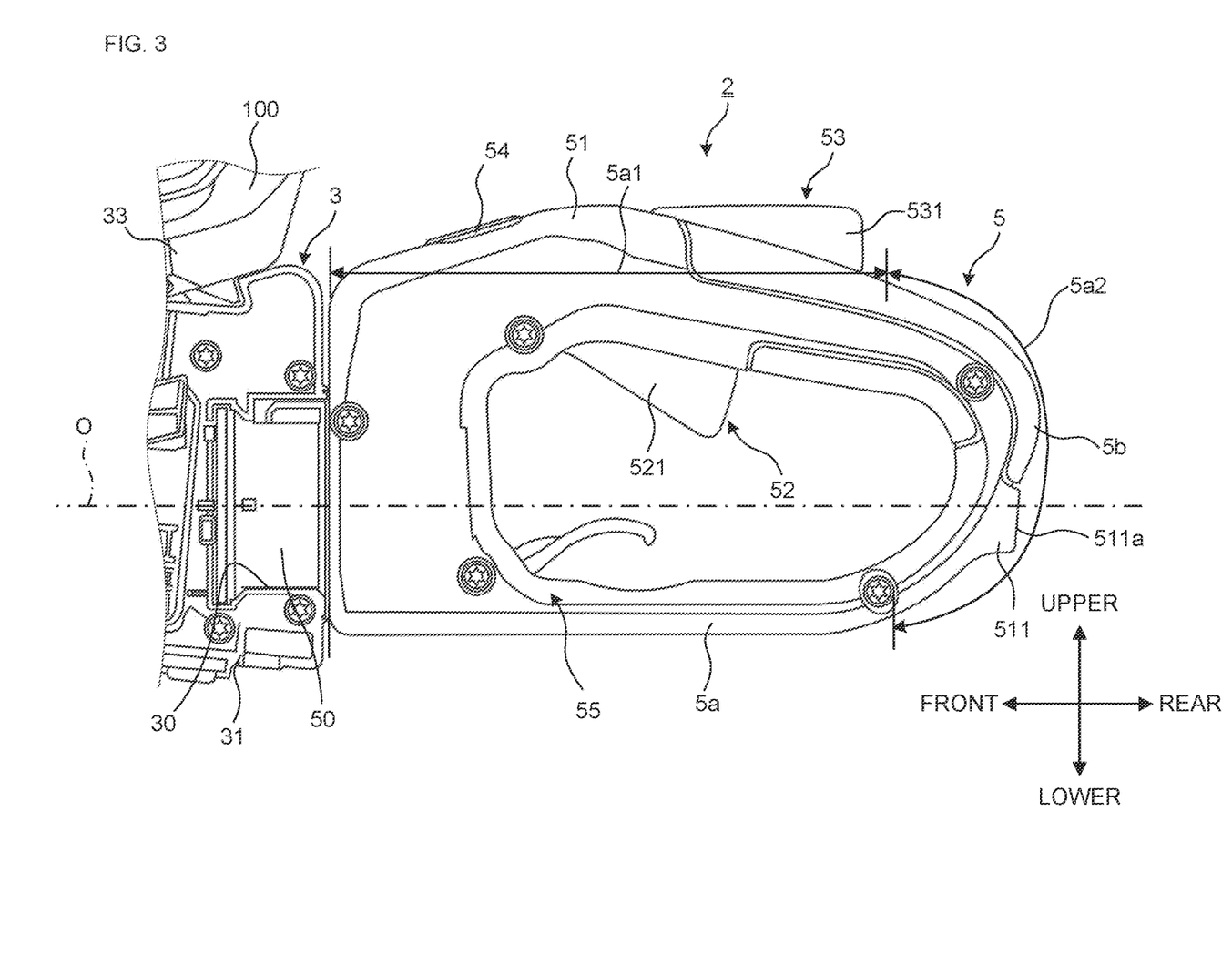
FIG. 3 is a side view of a drive operation unit with part of a main body case removed.
Figure 4:
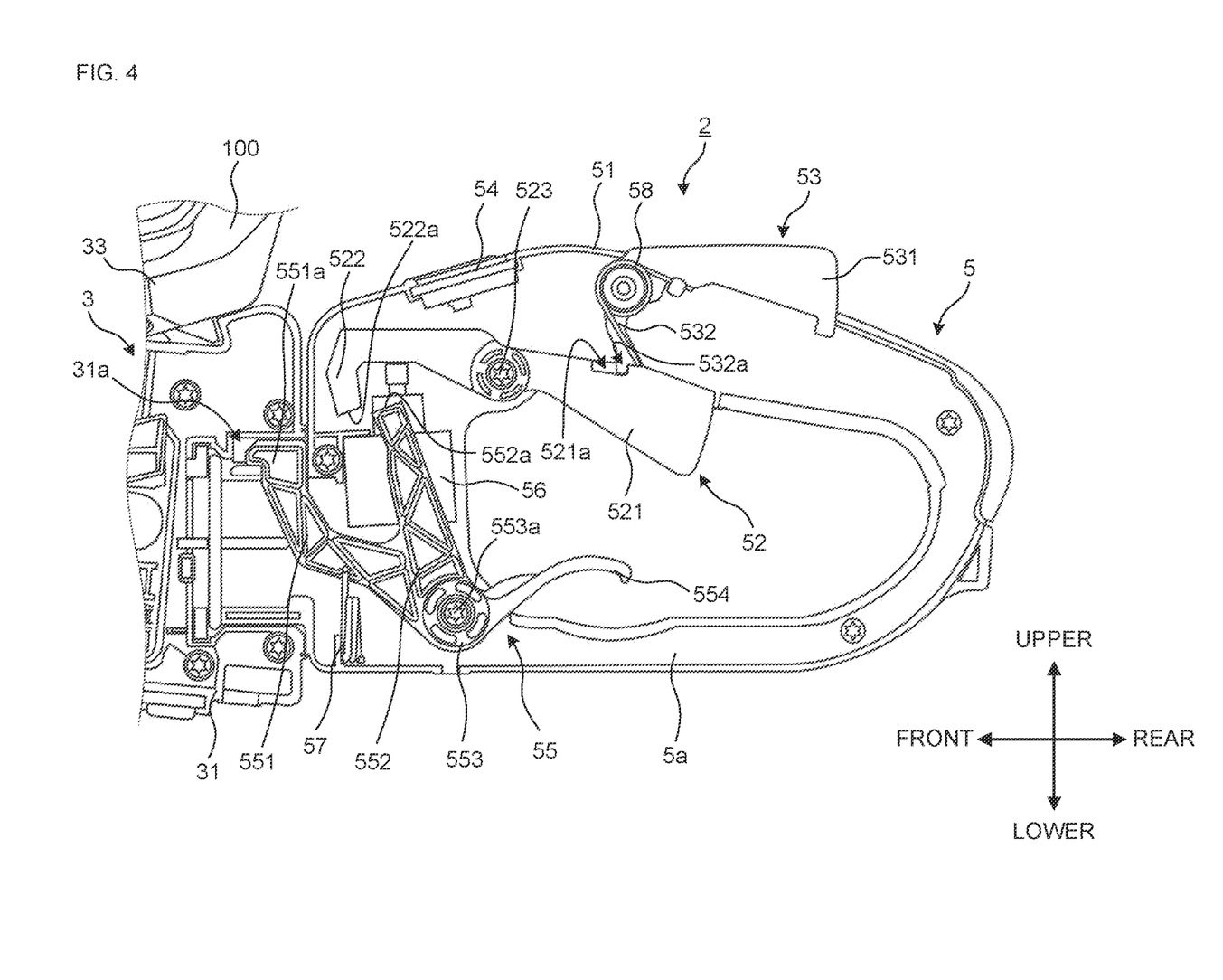
FIG. 4 is a side view of the drive operation unit with part of a handle case of a rear handle removed from the state of FIG. 3 (rotation lock state and movement lock state).
Figure 5:
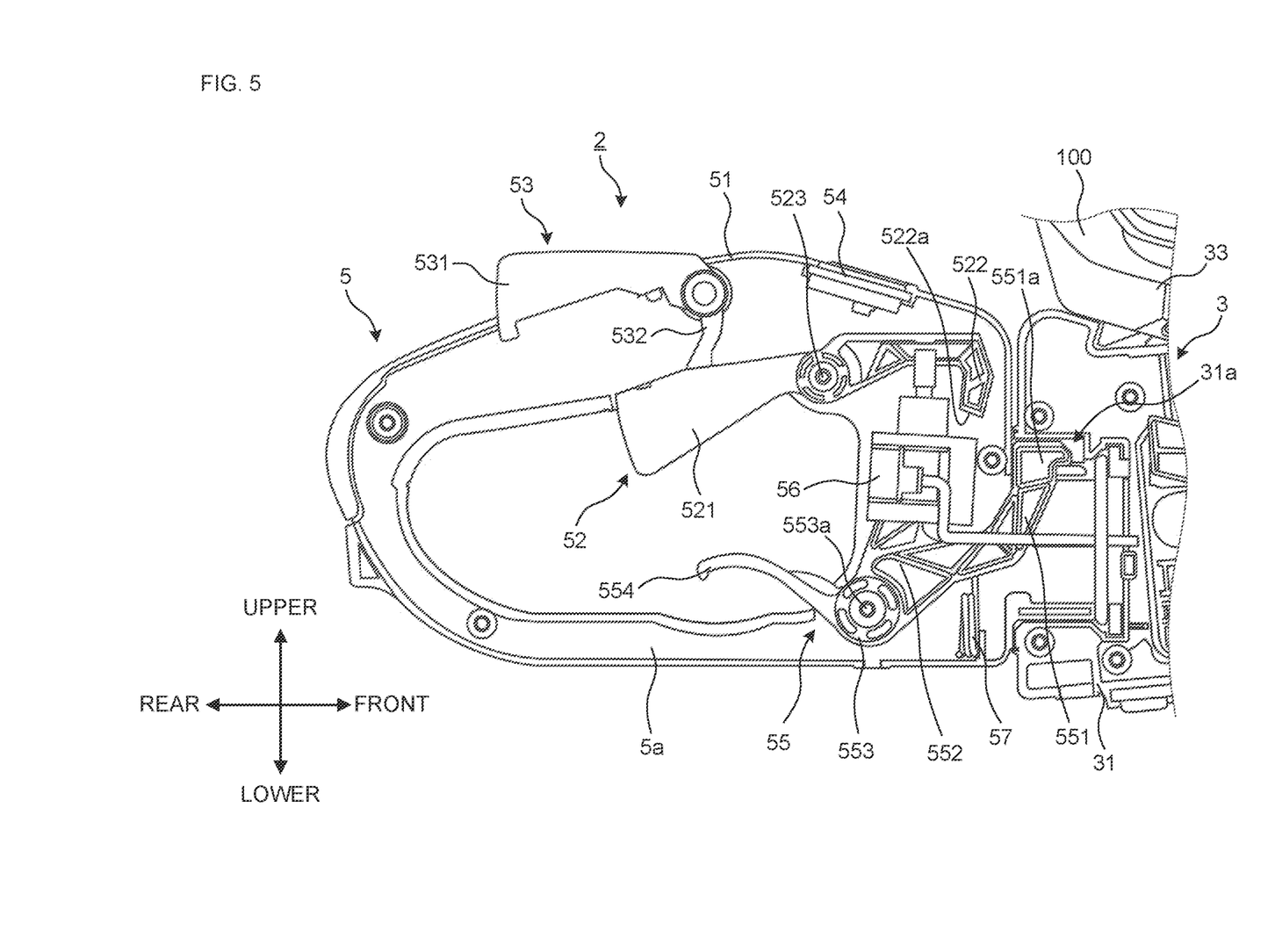
FIG. 5 is a side view of the drive operation unit with part of a side of the rear handle opposite to the handle case removed (rotation lock state and movement lock state).
Figure 6:
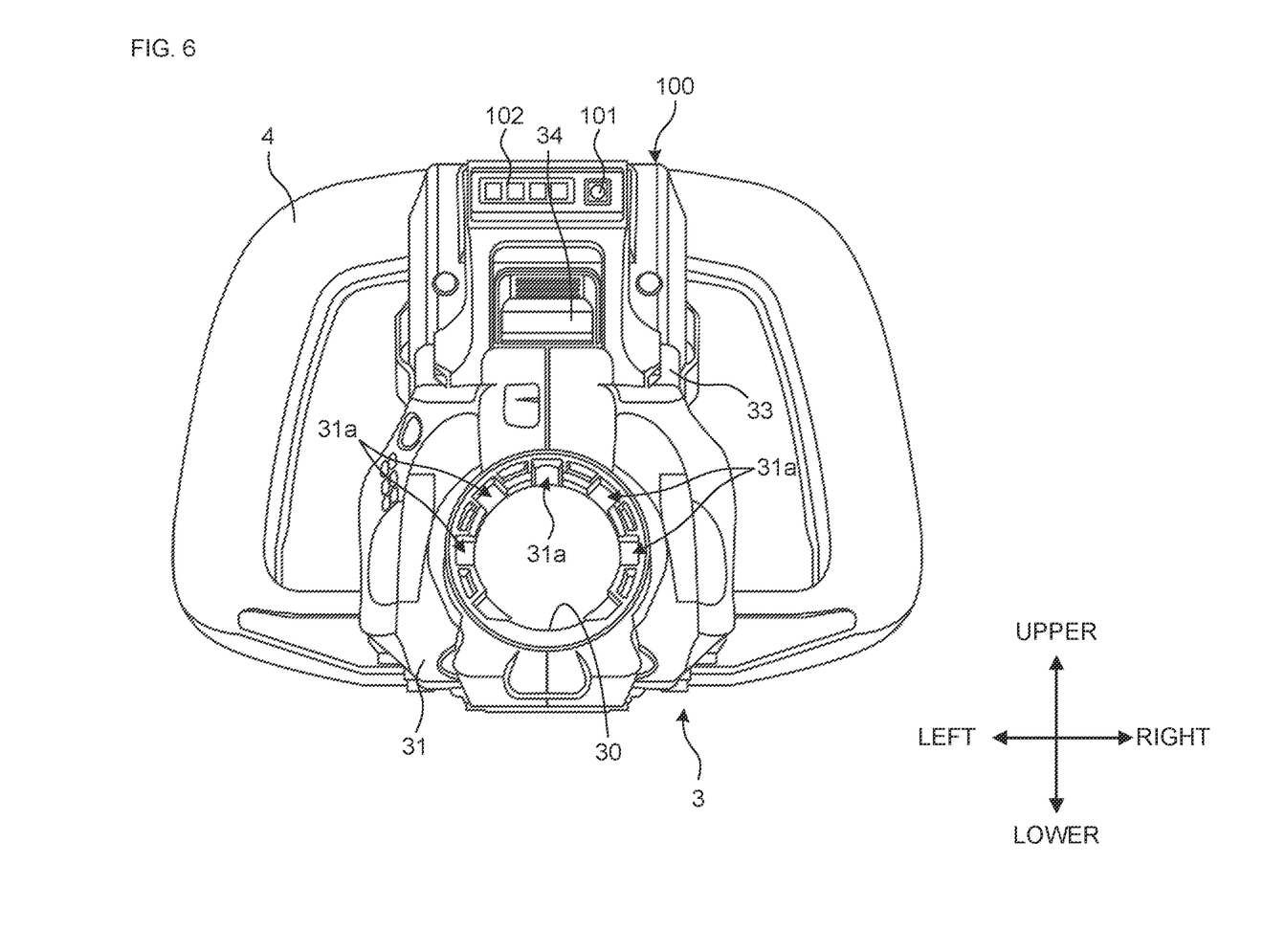
FIG. 6 is a rear view of a main body with the rear handle removed.
Figure 7:
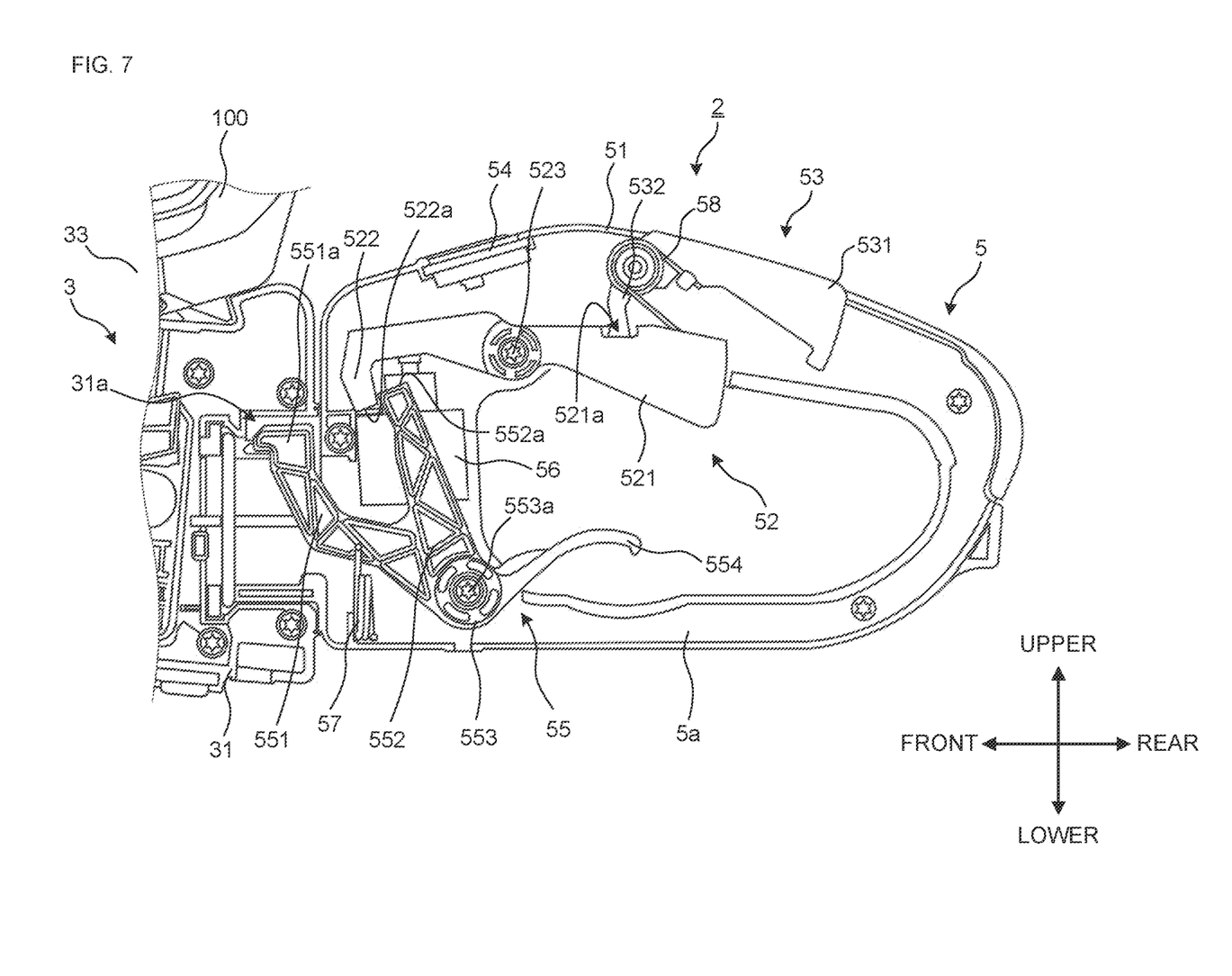
FIG. 7 is a side view illustrating a state where the movement lock state is released and a push operation on a drive switch is started via the throttle lever.
Figure 8:
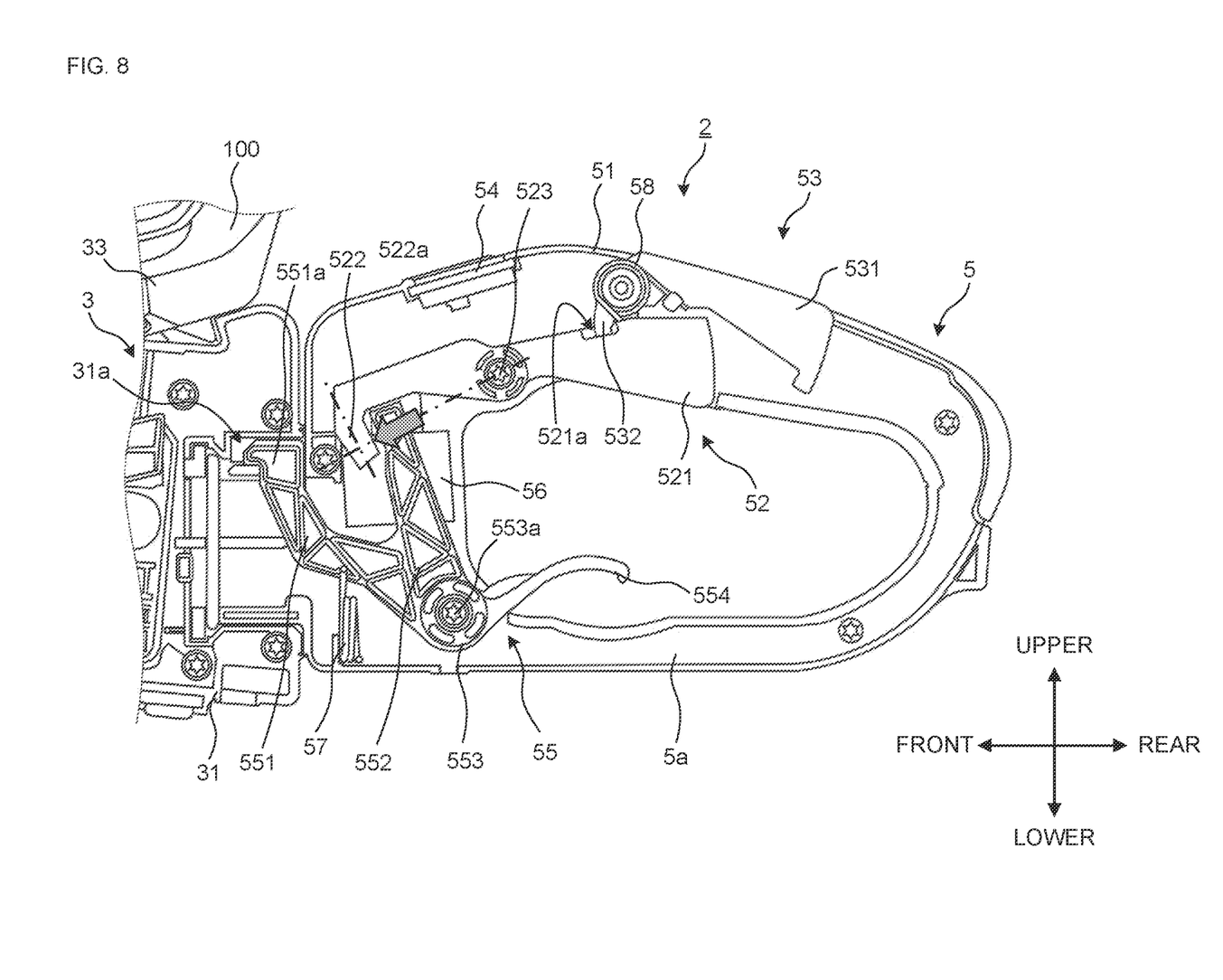
FIG. 8 is a side view illustrating the drive switch pushed deepest via the throttle lever.
Figure 9:
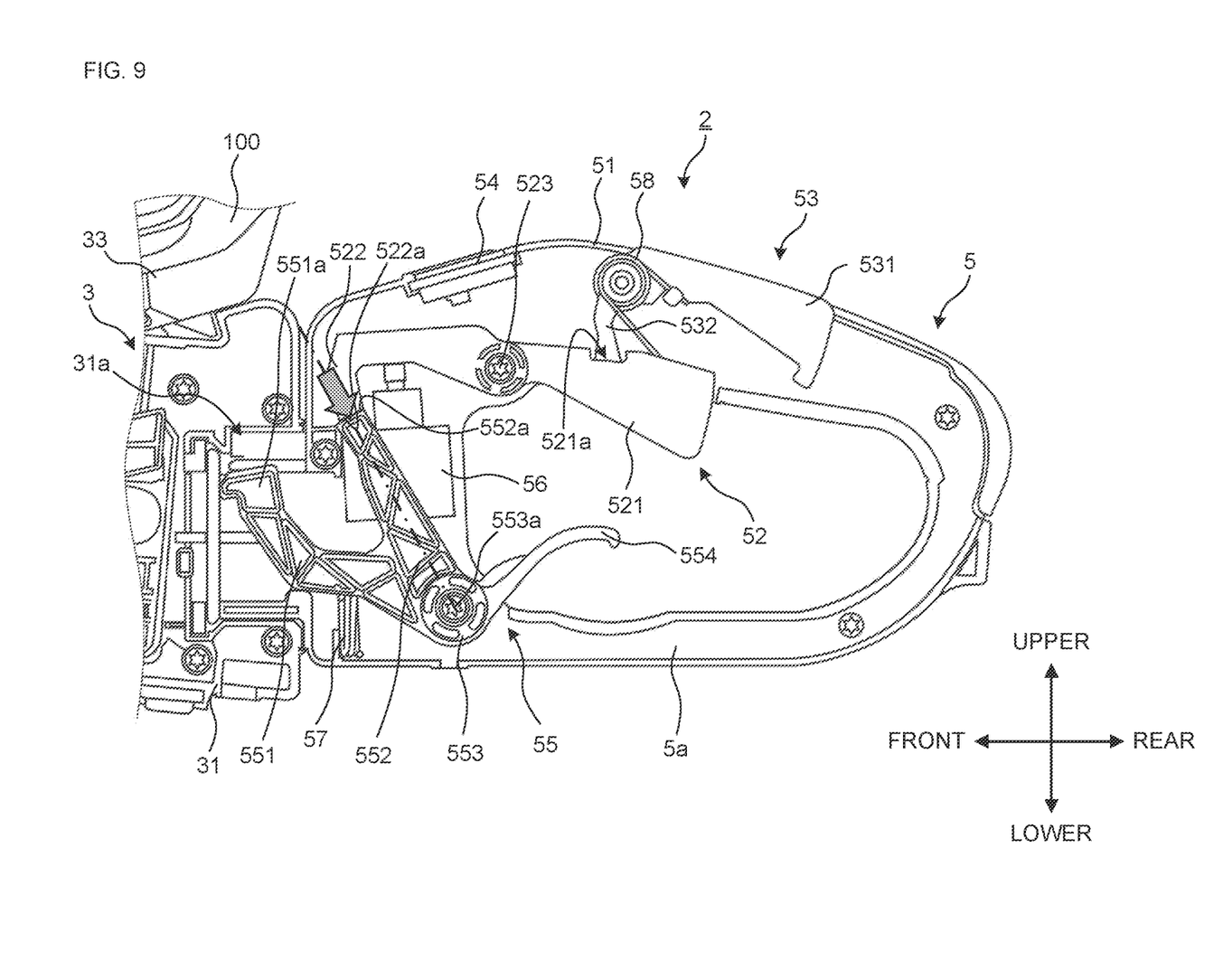
FIG. 9 is a side view of when a push operation on the drive switch is attempted via the throttle lever after the rotation lock state is released.

FIG. 1 is an overall upper perspective view of a hedge trimmer. FIG. 2 is an overall lower perspective view of the hedge trimmer. FIG. 3 is a side view of a drive operation unit with part of a main body case removed. FIG. 4 is a side view of the drive operation unit with part of a handle case of a rear handle removed from the state of FIG. 3 (rotation lock state and movement lock state). FIG. 5 is a side view of the drive operation unit with part of a side of the rear handle opposite to the handle case removed (rotation lock state and movement lock state). FIG. 6 is a rear view of a main body with the rear handle removed. FIG. 7 is a side view illustrating a state where a movement lock state is released and a push operation on a drive switch is started via the throttle lever. FIG. 8 is a side view illustrating the drive switch pushed deepest via the throttle lever. FIG. 9 is a side view of when a push operation on the drive switch is attempted via the throttle lever after the rotation lock state is released.

Directions of the hedge trimmer and respective components of the hedge trimmer are defined based on "upper and lower", "left and right", and "front and rear" represented in the drawings.

The hedge trimmer 1 illustrated in FIG. 1 is a small hand-held cutting working machine (drive apparatus) used for trimming and pruning hedges and trees, and is electrically driven with a battery 100 attached.

The hedge trimmer 1 includes a drive operation unit 2 and a cutter assembly 6 connected to the front side of the drive operation unit 2.

The drive operation unit 2 includes a main body 3, a front handle 4 disposed on the front side of the main body 3, and a rear handle 5 disposed on the rear side of the main body 3. With hands gripping the front handle 4 and the rear handle 5, the hedge trimmer 1 can be operated.

In the present embodiment, the apparatus main body comprises the main body 3 and the cutter assembly 6. In other words, the apparatus main body includes the cutter assembly 6 as a pruner configured to mow or cut an object.

The cutter assembly 6 is connected to the front side of the main body 3, and the rear part of the cutter assembly 6 is protected by a cover 7.

The cutter assembly (cutter assembly for hedge trimmers) 6 includes a lower cutter 61, an upper cutter 62, a lower cutter support 63, and an upper cutter support 64. The lower cutter 61 and the upper cutter 62 overlap each other and are slidable relatively to each other along the longitudinal direction (front-rear direction).

The configuration of the lower cutter 61 and the configuration of the upper cutter 62 are substantially the same.

The lower cutter support 63 is disposed on the lower side of the lower cutter 61. For weight reduction, the lower cutter support 63 is divided into two parts of a front support 63a and a rear support 63b, as illustrated in FIG. 2. In other words, the cutter assembly 6 includes the lower cutter support 63 covering part of the lower cutter 61 and disposed on a side of the lower cutter 61, the side being opposite to the upper cutter 62.

On the other hand, the upper cutter support 64 is disposed on the upper side of the upper cutter 62. The upper cutter support 64 extends along the longitudinal direction (front-back direction) of the cutter assembly 6.

Each of the lower cutter 61 and upper cutter 62 has a cutter main body M and a plurality of cutting edges B, the cutting edges B protruding laterally from the cutter main body M. The cutter assembly 6 according to the present embodiment has such a double-edged configuration that the plurality of cutting edges B of each of the lower cutter 61 and upper cutter 62 protrude from both sides of the cutter main body M.

The cutter main body M of the lower cutter 61 has an elongated hole 611 penetrating the cutter main body M in its thickness direction and elongating along the longitudinal direction of the cutter main body M. The cutter main body M of the upper cutter 62 has an elongated hole (not illustrated) as well, the elongated hole penetrating the cutter main body M in its thickness direction and elongating along the longitudinal direction of the cutter main body M. Forming such elongated holes can facilitate respective weight reduction of the lower cutter 61 and the upper cutter 62.

Each of the lower cutter 61 and upper cutter 62 may have a single-edged configuration with the plurality of edges B protruding from only one side of the cutter main body M.

The main body 3 has a main body case 31 and an electric motor 32 accommodated in the main body case 31.

The main body case 31 is a housing made of resin and has a top face sloping with respect to a bottom face. The top face of the main body case 31 slopes down from the rear side to the front side. In other words, the front part of the main body case 31 is lower than the rear part. The main body case 31 is formed in a substantially triangular shape as viewed from the lateral side.

The electric motor (power source) 32 is connected to the cutter assembly 6 via a drive transmission mechanism (not illustrated), and thereby the cutter assembly 6 is driven. As described below, the cutter assembly 6 has the lower cutter 61 and the upper cutter 62, and the electric motor 32 allows them to slide relatively to each other along the longitudinal direction.

The top face of the main body case 31 has a battery mount 33 for the battery 100 to be attached thereto. The battery mount 33 slopes down from the rear side to the front side in line with the top face of the main body case 31.

The battery 100 is a common battery providing a predetermined output by accommodating two or more lithium-ion battery cells in a rectangular case extending in the front-back direction.

As illustrated in FIG. 6, a rear end face of the battery 100 has a button 101 for power on/off and an indicator 102 representing remaining battery charge.

Although not illustrated in the drawings, an engagement portion for engaging with the battery mount 33 protrudes from the rear end part of a bottom face of the battery 100.

When the battery 100 is to be attached to the battery mount 33, the battery 100 slides from the rear side to the front side relatively to the battery mount 33 so that the lower part of the battery 100 fits into the battery mount 33. When the front end of the battery 100 reaches such a position that the front end of the battery 100 is supported by the front end of the battery mount 33, the engagement portion of the battery 100 engages with the battery mount 33 and thereby the battery 100 is fixed to the battery mount 33.

The battery 100 attached to the battery mount 33 slopes down from the rear side to the front side, and thereby the front part of the battery 100 is disposed lower than the rear part.

Atop face of the battery mount 33 has a metal connection terminal (not illustrated). The connection terminal is electrically connected to a control board (not illustrated) or the electric motor 32. When the connection terminal of the battery 100 is electrically connected to a connection terminal of the battery mount 33, power is supplied from the battery 100 to the control board or the electric motor 32.

When the battery 100 is to be removed from the battery mount 33, an operation on a connection lever 34 (see FIG. 2 and FIG. 6) on the rear end of the battery 100 releases the engagement state of the battery mount 33 and the engagement portion, and thereby allows the battery 100 to slide backward relatively to the battery mount 33.

A front handle 4 is disposed on the front side of the main body case 31, as illustrated in FIG. 1. The front handle 4 is disposed on the front side of the battery 100 attached to the battery mount 33.

The front handle 4 has a horizontal portion extending in the left-right direction and vertical portions extending downward from the left and right ends of the horizontal portion, and those portions are formed as a whole. The lower ends of the two vertical portions are fixed to the front end of the main body case 31.

A rear handle 5 is provided at the rear side of the main body case 31. As illustrated in FIG. 3, the rear handle 5 is connected to the rear part of the main body 3 (main body case 31) rotatably about, as a center of rotation O, an axis along the front-back direction. Specifically, a cylindrical connection 50 protrudes to the front side of the rear handle 5, and this connection 50 is disposed in a support portion 30 formed as a recess on a rear inner face of the main body 3. Thereby, the rear handle 5 is rotatably connected to the apparatus main body on a side opposite to the cutter assembly (pruner) 6.

The rear handle 5 has a grip 51 having an opening penetrating the rear handle 5 in the left-right direction. When an operator holds the hedge trimmer 1, he/she grips the rear handle 5 while inserting his/her hand into the opening of the grip 51.

A power switch 54 is disposed on the upper side of the rear handle 5.

The rear handle 5 includes a rotation lock mechanism, a drive operation mechanism, and a movement prevention mechanism.

The rotation lock mechanism includes a rotation lock lever 55 movable to a rotation prevention position where the rotation lock lever 55 engages with the apparatus main body (main body 3) to prevent the rear handle 5 from rotating relatively to the apparatus main body, and a rotation allowance position where the engagement with the apparatus main body is released and thereby the rear handle 5 is allowed to rotate relatively to the apparatus main body.

As illustrated in FIG. 4, the rotation lock lever 55 has a first arm 551 and a second arm 552. Each of the first arm 551 and the second arm 552 has an elongated planar shape. The second arm 552 has a substantially straight shape, while the first arm 551 extends at an angle to the second arm 552 toward the front side and bents at a middle part in the longitudinal direction.

Two or more ridges having a predetermined shape protrude from the left and right faces of each of the first arm 551 and the second arm 552. Such a configuration reinforces the first arm 551 and the second arm 552.

The rotation lock lever 55 is rotatably attached to the rear handle 5 (handle case 5a) at or near a connection 553 between the first arm 551 and the second arm 552. Thus, the rotation lock lever 55 is rotatable counterclockwise and clockwise about a center of rotation 553a within a predetermined angular range.

The first arm 551 has a claw 551a at its end opposite to the connection 553. In other words, the rotation lock lever 55 has the claw 551a at its end on the apparatus main body (main body 3) side. On the other hand, the apparatus main body has a groove 31a where the claw 551a is inserted thereinto. The rotation lock mechanism (rotation lock lever 55) and the apparatus main body (main body 3) are configured to be engaged with each other when the claw 551a is inserted into the groove 31a. In this state (rotation lock state), the rear handle 5 is prevented from rotating relatively to the main body 3. In other words, the position of the rotation lock lever 55 illustrated in FIG. 4 is the rotation prevention position.

As illustrated in FIG. 9, the rotation lock lever 55 rotates counterclockwise to release the claw 551a from the groove 31a. In this state (rotation unlocked state), the rear handle 5 is allowed to rotate relatively to the main body 3. In other words, the position of the rotation lock lever 55 illustrated in FIG. 9 is the rotation allowance position.

In the present embodiment, the apparatus main body (main body 3) has five (a plurality of) grooves 31a arranged in an arc shape. The five grooves 31a are disposed at a position "0°" on the upper side, at positions "45°" on the left and right sides, and at positions "90°" on the left and right sides, as illustrated in FIG. 6. The number of grooves 31a formed is not limited to five, but may be two, three, four, or six or more.

According to such a configuration, after the rotation lock lever 55 is set to the rotation allowance position, when the rear handle 5 is rotated relatively to the main body 3 and the claw 551a is inserted into a predetermined groove 31a, the rotation lock lever 55 is set to the rotation prevention position. This allows the main body 3 and the rear handle 5 to be fixed in a state where the upper-lower direction of the cutter assembly 6 and the upper-lower direction of the rear handle 5 are misaligned in the circumferential direction. This improves the workability of the hedge trimmer 1 (cutter assembly 6) in pruning work on hedge surfaces along a vertical direction.

The rotation lock lever 55 further includes an operation portion 554 configured to allow a rotation operation on the rotation lock lever 55, the operation portion 554 being disposed on a side opposite to the first arm 551 across the second arm 552. The operation portion 554 is also connected to or connected near the connection 553 between the first arm 551 and the second arm 552. This allows the rotation lock lever 55 to be rotated with relatively little force.

The operation portion 554 has a curved shape convex to the upper side and is disposed within a range reachable for a finger operating the throttle lever 52. Therefore, when the operator wants to rotate the rear handle 5 relatively to the main body 3, the operator can, while grasping the grip 51 with his/her hand, release a finger (index or middle finger) operating the throttle lever 52 to stop the activated cutter assembly 6 and can hook, to the operation portion 554, the finger (index or middle finger) having operated the throttle lever 52. In other words, without moving the hand grasping the grip 51, the operator can carry out an operation for activating of the cutter assembly 6 or rotating the rear handle 5 safely and with one hand, and can easily carry out a rotation operation on the rotation lock lever 55.

The second arm 552 has a contact face 552a on its end face opposite to the connection 553, the contact face 552a coming into contact with the below-described tip face of the contact portion 522 of the throttle lever 52.

In the present embodiment, the first arm 551, the second arm 552, the connection 553, and the operation portion 554 are formed as a whole, but they may be separately formed and then connected to each other.

The rotation lock mechanism further includes a torsion spring (bias member) 57, as illustrated in FIG. 4. The torsion spring 57 is fixed to the inner face of the handle case 5a on the lower side of the first arm 551 and is in contact with the first arm 551. Thereby, the torsion spring 57 biases the rotation lock lever 55 to rotate clockwise. In other words, the torsion spring 57 is configured to bias the rotation lock lever 55 from the rotation allowance position (see FIG. 9) toward the rotation prevention position (see FIG. 4).

Therefore, in a state where the rotation lock lever 55 is present at the rotation allowance position, when a finger or the like is removed from the operation portion 554, the biasing force of the torsion spring 57 allows the rotation lock lever 55 to rotate clockwise and to reach the rotation prevention position where the claw 551a is inserted into the groove 31a.

The bias member is not limited to the torsion spring 57, but may be, for example, a leaf spring, a coil spring, an elastic rubber block, or the like.

The drive operation mechanism includes a drive switch 56 and the throttle lever 52.

The drive switch 56 controls the activation of the cutter assembly (pruner) 6. Specifically, depending on its pushed amount (see FIG. 7 and FIG. 8), the drive switch 56 controls the rotation speed of the electric motor 32 to increase or decrease the movement speed (slide speed) of the cutter assembly 6 (lower cutter 61 and upper cutter 62).

The throttle lever 52 has a long lever main body 521. Middle part of the lever main body 521 in its longitudinal direction is rotatably attached to the rear handle 5 (handle case 5a). By such a configuration, the throttle lever 52 is configured to be rotatable (movable) about the center of rotation 523 to a contact position (see FIG. 7 and FIG. 8) where the throttle lever 52 contacts the head of the drive switch 56 and pushes it downward and to a non-contact position (see FIG. 4) where the throttle lever is separated from the drive switch 56.

The throttle lever 52 has a contact portion 522. The contact portion 522 is connected to the end (front end) of the lever main body 521 on the apparatus main body side in such a manner that the contact portion 522 extends from the lever main body 521 toward the rotation lock lever 55.

As illustrated in FIG. 5, two or more ridges having a predetermined shape protrudes from the front part of the lever main body 521 and the right side face of the contact portion 522.

Such a configuration reinforces the front parts of the lever main body 521 and the contact portion 522.

In the present embodiment, the lever main body 521 and the contact portion 522 are formed as a whole, but they may be formed as separate bodies and then connected to each other.

As illustrated in FIG. 9, the contact portion 522 is configured to contact the rotation lock lever 55 (second arm 552) present at the rotation allowance position.

Thus, the throttle lever 52 is configured to contact (touch) the rotation lock lever 55 to maintain the non-contact position, when the rotation lock lever 55 is present at the rotation allowance position. Thereby, during a rotation operation on the rear handle 5 relatively to the apparatus main body (main body 3), when the drive switch 56 is accidentally pushed by the throttle lever 52, it is possible to prevent well the cutter assembly 6 from being activated. Thus, such a configuration is highly safe for the operator.

As illustrated in FIG. 9, the contact faces 522a and 552a of the contact portion 522 and the rotation lock lever 55 (second arm 552) are substantially orthogonal to the force applied from the contact portion 522 to the rotation lock lever 55 (second arm 552). Such a configuration facilitates maintenance of the contact state of the contact portion 522 with the second arm 552. Therefore, it is possible to prevent well the contact portion 522 from being unwantedly moved relatively to the second arm 552 and then allowing the lever main body 521 of the throttle lever 52 to push the drive switch 56.

The force (thick arrow in FIG. 9) applied to the rotation lock lever 55 (second arm 552) from the contact portion 522 may be applied along the longitudinal direction of the second arm 552, and the center of rotation 553a of the rotation lock lever 55 may be disposed on the side to which the force is applied. This can more reliably prevent unwanted movement of the contact portion 522 relative to the second arm 552.

In a state where the rotation lock lever 55 is present at the rotation allowance position, if the rotation lock lever 55 slightly rotated clockwise, a rear corner of the claw 551a would come into contact with a portion between adjacent grooves 31a of the main body 3 (main body case 31). This contact would be resistance to the rotation operation on the rear handle 5 relative to the apparatus main body (main body 3).

In contrast, according to the present embodiment, the contact state is securely maintained between the contact portion 522 and the second arm 552 as described above, and the clockwise and counterclockwise rotation of the rotation lock lever 55 is restricted. Therefore, it is possible to prevent well occurrence of the inconvenience caused by the rear corner of the claw 551a contacting the main body 3.

As illustrated in FIG. 7 and FIG. 8, when the rotation lock lever 55 is present at the rotation prevention position, the throttle lever 52 is configured to be allowed to rotate (move) from the non-contact position to the contact position relatively to the drive switch 56. Thus, the throttle lever 52 can securely push the drive switch 56 and securely allow the cutter assembly 6 to activate.

In this state, that is, in a state where the throttle lever 52 is present at the contact position with the drive switch 56, when a rotation operation on the rotation lock lever 55 toward the rotation allowance position, the second arm 552 contacts the side (rear lateral side) of the contact portion 522 of the throttle lever 52, and thereby the rotation of the second arm is restricted. This prevents the rear handle 5 from rotating relatively to the apparatus main body (main body 3) when the cutter assembly 6 is activated, providing a high level of safety.

The force (thick arrow in FIG. 8) applied from the second arm 552 to the lateral side of the contact portion 522 may be applied along a direction substantially orthogonal to the longitudinal direction of the contact portion 522, and the center of rotation 523 of the throttle lever 52 may be disposed on a side opposite to the side to which the force is applied. This can more reliably prevent unwanted movement of the second arm 552 from the contact portion 522.

The movement prevention mechanism is configured to prevent the throttle lever 52 from moving from the non-contact position to the contact position with the drive switch 56. Specifically, the movement prevention mechanism includes a lock release lever 53.

The lock release lever 53 has a long lever main body 531. The lever main body 521 is rotatably attached to the rear handle 5 (handle case 5a) at its front end in the longitudinal direction.

The lock release lever 53 has a retention portion 532. This retention portion 532 is connected to the end of the lever main body 531 on the apparatus main body (main body 3) side in such a manner that the retention portion 532 extends from the lever main body 531 toward the throttle lever 52.

In the present embodiment, the lever main body 531 and the retention portion 532 are formed as a whole, but they may be separately formed and then connected to each other.

Furthermore, a notch 532a is formed at an end of the retention portion 532, the end being opposite to the lever main body 531.

The retention portion 532 is configured so that its notch 532a is retained at an edge of an opening 521a formed on the lever main body 521 present at the non-contact position, as illustrated in FIG. 4. This restricts the counterclockwise rotation of the throttle lever 52.

From this state (movement lock state), rotating the lock release lever 53 clockwise releases, as illustrated in FIG. 7, the retention of the retention portion 532 (notch 532a) at the edge of the opening 521a of the throttle lever 52 and allows the retention portion 532 to be disposed right above the opening 521a of the lever main body 521. This state is a movement unlock state in which the movement lock state is released.

Therefore, the counterclockwise rotation operation on the throttle lever 52 can be performed without being prevented by the lock release lever 53. As a result, the throttle lever 52 can be rotated (moved) from the non-contact position toward the contact position, as illustrated in FIG. 8.

The movement prevention mechanism further includes a torsion spring (bias member) 58 configured to bias the lock release lever 53 in a direction away from the throttle lever 52. As illustrated in FIG. 4, one end of this torsion spring 58 is fixed to the lever main body 531 of the lock release lever 53 and the other end is fixed to a rear portion of the lever main body 521 of the throttle lever 52, the rear portion being disposed on the rear side of the center of rotation 523.

As illustrated in FIG. 8, in a state where the grip 51 is gripped, when the lever main body 531 of the lock release lever 53 and the rear portion of the lever main body 521 of the throttle lever 52 are pushed and thereby brought closer to each other, the compressed torsion spring 58 biases them in directions away from each other.

In this state, when the pushing force to the rear portion of the lever main body 521 is released, the biasing force of the torsion spring 58 allows the rear portion of the lever main body 521 to be away from the lever main body 531 as illustrated in FIG. 7.

With such a rear handle 5, it is possible to grasp the grip 51 with one hand and, for example, to carry out an operation for pushing the lock release lever 53 with the palm of the hand, an operation for pulling up the throttle lever 52 with the index and middle fingers, and in addition, an operation for pulling up the rotation lock lever 55 with the same index and middle fingers that operate the throttle lever 52.

In other words, the rear handle 5 provides excellent operability of enabling rotation operations on the three levers with one hand.

In such a rear handle 5, designs of the configuration and arrangement of each lever 52 to 53 do not allow simultaneous occurrence of the rotation operation on the rear handle 5 relative to the apparatus main body and the activation operation for the cutter assembly 6, which provides a high level of safety.

The rear handle 5 (handle case S*a*, throttle lever 52, lock release lever 53, and rotation lock lever 55), front handle 4, and main body case 31 described above may each be made of relatively hard resin material in order that mechanical strength is ensured.

Such relatively hard resin material includes, for example, ABS resin, AS resin, polyamide (nylon), acrylic resin, polycarbonate, polyethylene terephthalate, and the like. One of these resins may be used alone or two or more of them may be used in combination.

As illustrated in FIG. 3, the rear handle 5 has a handle case 5*a* and a shock absorption member 5*b* disposed outside the handle case S*a*. The handle case 5*a* has an annular shape having the opening as described regarding the grip 51.

The handle case 5*a* includes a first part 5*a*1 extending on the opposite side (rear side) of the cutter assembly 6 and has a second part 5*a*2 continuous with the first part 5*a*1 and curving toward the center of rotation O side (lower side) of the rear handle 5. The first part 5*a*1 accommodates the drive operation mechanism and the movement prevention mechanism.

The shock absorption member 5*b* covers at least an area furthest from the apparatus main body (main body 3) (the area protruding most rearwardly) in the second part 5*a*2. In the present embodiment, the shock absorption member 5*b* covers over a rear area of the first part 5*a*1 to the area of the second part 5*a*2 furthest from the apparatus main body (main body 3).

The shock absorption member 5*b* is made of, for example, rubber material such as silicone rubber, urethane rubber, chloroprene rubber, and nitrile rubber.

With such a configuration, even when the hedge trimmer 1 is dropped unintentionally with the cutter assembly 6 pointed vertically upward, the shock absorption member 5*b* absorbs the shock from the ground, making it difficult for the rear handle 5 to be damaged.

The handle case 5*a* further has a convex portion 511 protruding on the opposite side (rear side) to the apparatus main body (main body 3). The convex portion 511 is formed as a whole with the handle case 5*a* and has a flat face 511*a* substantially orthogonal to the center of rotation O of the rear handle 5.

The convex portion 511 is disposed adjacent to the shock absorption member 5*b* and disposed so that the center of rotation O penetrates through it. With such a convex portion 511 provided, after the shock from the ground is absorbed by the shock absorption member 5*b*, the shock is further absorbed by the convex portion 511 in contact with the ground, making it possible to more securely prevent the rear handle 5 from being damaged.

The convex portion 511 may be formed separately from the handle case 5*a* and then may be fixed to the handle case 5*a*.

In the above-described hedge trimmer 1, designs of the configuration and arrangement of the respective levers 52 to 53 do not allow simultaneous occurrence of the rotation operation on the rear handle 5 relative to the apparatus main body and the activation operation for the cutter assembly 6, which provides a high level of safety.

An engine may be used to power the hedge trimmer 1 instead of the electric motor 32.

The pruner configured to cut the object may be a disk having pruning blades on its periphery, a chainsaw having continuously moving pruning blades, or the like.

In addition, the present invention may be provided in each of the following aspects.

(1) A hand-held drive apparatus comprising: an apparatus main body including a pruner configured to mow or cut an object; and a handle rotatably connected to a side of the apparatus main body, the side being opposite to the pruner, the handle including: a rotation lock mechanism including a rotation lock lever, the rotation lock lever being movable to: a rotation prevention position where the rotation lock lever engages with the apparatus main body to prevent the handle from rotating relatively to the apparatus main body, and a rotation allowance position where the engagement with the apparatus main body is released and thereby the handle is allowed to rotate relatively to the apparatus main body; and a drive operation mechanism including: a switch configured to control activation of the pruner; and a throttle lever movable to a contact position where the throttle lever pushes the switch and a non-contact position where the throttle lever is separated from the switch, the throttle lever being configured to: when the rotation lock lever is present at the rotation allowance position, contact the rotation lock lever to maintain the non-contact position, and when the rotation lock lever is present at the rotation prevention position, be allowed to move to the contact position.

(2) The drive apparatus according to (1), wherein: the rotation lock lever has a claw at its end on an apparatus main body side, the apparatus main body has a groove where the claw is inserted thereinto, and the rotation lock mechanism and the apparatus main body are configured to be engaged with each other when the claw is inserted into the groove.

(3) The drive apparatus according to (2), wherein: the apparatus main body has a plurality of the grooves arranged in an arc shape.

(4) The drive apparatus according to any one of (1) to (3), wherein: the throttle lever has a long lever main body and a contact portion, a middle part of the lever main body in its longitudinal direction is rotatably attached to the handle, the contact portion is configured to: be connected to an end of the lever main body on an apparatus main body side in such a manner that the contact portion extends from the lever main body toward the rotation lock lever, and thereby contact the rotation lock lever present at the rotation allowance position.

(5) The drive apparatus according to (4), wherein: contact faces of the contact portion and the rotation lock lever are substantially orthogonal to force applied from the contact portion to the rotation lock lever.

(6) The drive apparatus according to (5), wherein: the rotation lock lever includes: a first arm having the claw; and a second arm having the contact face, and the rotation lock lever is rotatably attached to the handle at or near a connection between the first arm and the second arm.

(7) The drive apparatus according to (6), wherein: the force applied from the contact portion to the rotation lock lever is applied along a longitudinal direction of the second arm, and a center of rotation of the rotation lock lever is disposed on a side to which the force is applied.

(8) The drive apparatus according to claim 6 or (7), wherein: the rotation lock lever further has an operation portion configured to allow rotation operation on the rotation lock lever, the operation portion being disposed on a side opposite to the first arm across the second arm.

(9) The drive apparatus according to (8), wherein: the operation portion is connected to or near the connection between the first arm and the second arm.

(10) The drive apparatus according to (9), wherein: in a state where the throttle lever is present at the contact position, when a rotation operation on the rotation lock lever toward the rotation allowance position is attempted, the second arm contacts a lateral side of the contact portion of the throttle lever, and thereby rotation of the second arm is restricted.

(11) The drive apparatus according to (10), wherein: force applied from the second arm to the lateral side of the contact portion is applied along a direction substantially orthogonal to a longitudinal direction of the contact portion, and a center of rotation of the throttle lever is disposed on a side opposite to a side to which the force is applied.

(12) The drive apparatus according to any one of (1) to (11), wherein: the rotation lock mechanism further includes a bias member configured to bias the rotation lock lever from the rotation allowance position toward the rotation prevention position.

(13) The drive apparatus according to any one of (1) to (12), wherein: the handle further includes a movement prevention mechanism configured to prevent the throttle lever from moving from the non-contact position to the contact position.

(14) The drive apparatus according to any one of (1) to (13), wherein: the handle further has: a handle case having: a first part extending to a side opposite to the pruner; and a second part continuous with the first part and curving toward a center of rotation of the handle; and a shock absorption member disposed outside the handle case and covering at least an area furthest from the apparatus main body in the second part.

(15) The drive apparatus according to (14), wherein: the handle case further has a convex portion protruding on a side opposite to the apparatus main body, and the convex portion has a flat face substantially orthogonal to the center of rotation of the handle.

Of course, the present invention is not limited to those.

Finally, various embodiments of the present invention have been described, but these are presented as examples and are not intended to limit the scope of the invention. Novel embodiments can be implemented in various other forms, and various omissions, replacements, and modifications can be made within the scope of the spirit of the invention. The embodiments and its modifications are included in the scope and the spirit of the disclosure and are included in the scope of the invention described in claims and the equivalent scope thereof.

What is claimed is:

1. A hand-held drive apparatus comprising:
an apparatus main body including a pruner configured to mow or cut an object; and
a handle rotatably connected to a side of the apparatus main body, the side being opposite to the pruner, the handle including:
a rotation lock mechanism including a rotation lock lever, the rotation lock lever being movable to:
a rotation prevention position where the rotation lock lever engages with the apparatus main body to prevent the handle from rotating relatively to the apparatus main body, and
a rotation allowance position where the engagement with the apparatus main body is released and thereby the handle is allowed to rotate relatively to the apparatus main body; and
a drive operation mechanism including:
a switch configured to control activation of the pruner; and
a throttle lever movable to a contact position where the throttle lever pushes the switch and a non-contact position where the throttle lever is separated from the switch, the throttle lever being configured to:
when the rotation lock lever is present at the rotation allowance position, contact the rotation lock lever to maintain the non-contact position, and
when the rotation lock lever is present at the rotation prevention position, be allowed to move to the contact position.

2. The drive apparatus according to claim 1, wherein:
the rotation lock lever has a claw at its end on an apparatus main body side,
the apparatus main body has a groove where the claw is inserted thereinto, and
the rotation lock mechanism and the apparatus main body are configured to be engaged with each other when the claw is inserted into the groove.

3. The drive apparatus according to claim 2, wherein:
the apparatus main body has a plurality of the grooves arranged in an arc shape.

4. The drive apparatus according to claim 1, wherein:
the throttle lever has a long lever main body and a contact portion,
a middle part of the lever main body in its longitudinal direction is rotatably attached to the handle, and
the contact portion is configured to:
be connected to an end of the lever main body on an apparatus main body side in such a manner that the contact portion extends from the lever main body toward the rotation lock lever, and thereby contact the rotation lock lever present at the rotation allowance position.

5. The drive apparatus according to claim 4, wherein:
contact faces of the contact portion and the rotation lock lever are substantially orthogonal to force applied from the contact portion to the rotation lock lever.

6. The drive apparatus according to claim 5, wherein:
the rotation lock lever includes:
- a first arm having a claw at an end on an apparatus main body side; and
- a second arm having the contact face, and the rotation lock lever is rotatably attached to the handle at or near a connection between the first arm and the second arm.

7. The drive apparatus according to claim 6, wherein:
the force applied from the contact portion to the rotation lock lever is applied along a longitudinal direction of the second arm, and
a center of rotation of the rotation lock lever is disposed on a side to which the force is applied.

8. The drive apparatus according to claim 6, wherein:
the rotation lock lever further has an operation portion configured to allow rotation operation on the rotation lock lever, the operation portion being disposed on a side opposite to the first arm across the second arm.

9. The drive apparatus according to claim 8, wherein:
the operation portion is connected to or near the connection between the first arm and the second arm.

10. The drive apparatus according to claim 9, wherein:
in a state where the throttle lever is present at the contact position, when a rotation operation on the rotation lock lever toward the rotation allowance position is attempted, the second arm contacts a lateral side of the contact portion of the throttle lever, and thereby rotation of the second arm is restricted.

11. The drive apparatus according to claim 10, wherein:
force applied from the second arm to the lateral side of the contact portion is applied along a direction substantially orthogonal to a longitudinal direction of the contact portion, and
a center of rotation of the throttle lever is disposed on a side opposite to a side to which the force is applied.

12. The drive apparatus according to claim 1, wherein:
the rotation lock mechanism further includes a bias member configured to bias the rotation lock lever from the rotation allowance position toward the rotation prevention position.

13. The drive apparatus according to claim 1, wherein:
the handle further includes a movement prevention mechanism configured to prevent the throttle lever from moving from the non-contact position to the contact position.

14. The drive apparatus according to claim 1, wherein:
the handle further has:
a handle case having:
- a first part extending to a side opposite to the pruner; and
- a second part continuous with the first part and curving toward a center of rotation of the handle; and a shock absorption member disposed outside the handle case and covering at least an area furthest from the apparatus main body in the second part.

15. The drive apparatus according to claim 14, wherein:
the handle case further has a convex portion protruding on a side opposite to the apparatus main body, and
the convex portion has a flat face substantially orthogonal to the center of rotation of the handle.

* * * * *